(12) United States Patent
Woodbeck et al.

(10) Patent No.: US 10,832,305 B1
(45) Date of Patent: Nov. 10, 2020

(54) SYSTEM AND METHOD FOR IMAGE PROCESSING AND SEARCHING FOR CLASSIFICATION IN A PRODUCT DATABASE

(71) Applicants: Kris Woodbeck, Gloucester (CA); Huiqiong Chen, Gloucester (CA)

(72) Inventors: Kris Woodbeck, Gloucester (CA); Huiqiong Chen, Gloucester (CA)

(73) Assignee: Pcsso Inc., Ottawa (CA)

( * ) Notice: Subject to any disclaimer, the term of this patent is extended or adjusted under 35 U.S.C. 154(b) by 905 days.

(21) Appl. No.: 15/248,190

(22) Filed: Aug. 26, 2016

Related U.S. Application Data

(60) Provisional application No. 62/210,042, filed on Aug. 26, 2015.

(51) Int. Cl.
| | |
|---|---|
| *G06Q 30/06* | (2012.01) |
| *G06N 3/08* | (2006.01) |
| *G06F 16/51* | (2019.01) |
| *G06F 16/58* | (2019.01) |

(52) U.S. Cl.
CPC ......... *G06Q 30/0631* (2013.01); *G06F 16/51* (2019.01); *G06F 16/5866* (2019.01); *G06N 3/08* (2013.01); *G06Q 30/0643* (2013.01)

(58) Field of Classification Search
CPC ............. G06Q 30/0631; G06Q 10/087; G06Q 30/0629; G06Q 30/0643; H04L 51/063; H04L 51/12; G06K 9/4628; G06K 9/6807
See application file for complete search history.

(56) References Cited

U.S. PATENT DOCUMENTS

| | | | | |
|---|---|---|---|---|
| 9,008,435 | B2 * | 4/2015 | Gokturk | G06Q 30/0603 382/190 |
| 9,607,248 | B2 * | 3/2017 | Bhardwaj | G06Q 30/0643 |
| 9,928,532 | B2 * | 3/2018 | Torres | G06F 16/951 |
| 10,255,703 | B2 * | 4/2019 | Gonzales, Jr. | G06K 9/4652 |
| 2008/0097975 | A1 * | 4/2008 | Guay | G06F 16/58 |
| 2009/0148068 | A1 * | 6/2009 | Woodbeck | G06F 16/5838 382/305 |
| 2011/0200251 | A1 * | 8/2011 | Chin | G06K 9/4642 382/168 |
| 2011/0314031 | A1 * | 12/2011 | Chittar | G06F 16/5838 707/749 |
| 2012/0310769 | A1 * | 12/2012 | Lawrence | G06Q 30/0631 705/26.7 |
| 2015/0242805 | A1 * | 8/2015 | Sakurai | G06Q 30/06 705/28 |

\* cited by examiner

*Primary Examiner* — Florian M Zeender
*Assistant Examiner* — Milena Racic
(74) *Attorney, Agent, or Firm* — Garvey, Smith & Nehrbass, Patent Attorneys, L.L.C.; Seth M. Nehrbass; Fabian M. Nehrbass

(57) ABSTRACT

A method for resolving out of stock products in online shopping using image classification is disclosed. Product images are processed to determine feature descriptors to generate object classifiers to associated image similarities. A product is determined to be unavailable from a retailer. The product identifier is then provided to a hierarchical database containing indexed product images to determine therefrom other products whose images have classified similarities to images of the product. Similar products can then be presented to the user based upon their visual characteristics providing an improved product correlation.

13 Claims, 13 Drawing Sheets

SYSTEM AND METHOD FOR IMAGE PROCESSING AND SEARCHING FOR CLASSIFICATION IN A PRODUCT DATABASE

CROSS REFERENCE TO RELATED APPLICATIONS

This application claims priority from U.S. Provisional Application No. 62/210,042 filed Aug. 26, 2015, the entirety of which is hereby incorporated by reference for all purposes.

TECHNICAL FIELD

The disclosure relates generally to image processing and searching, and more particularly to classifying images for use in handling search results that indicate unavailable content.

BACKGROUND

Current image search technologies are typically based on either metadata such as keywords or overall image features such as RGB or brightness histograms. The search results provided are only as good as the keyword provided and the accuracy of the keywords present in the database. Although humans can easily determine similarities between images and can categorize images, computer systems to date have not provided efficient searching means to deal with large image collections. This short coming leads to problems and inefficiencies particularly for online retailers and the e-commerce industry.

E-commerce is a trillion dollar a year industry and growing. In e-commerce, a customer searches the Internet to find a product to purchase from an online retailer, for example. When a product is found, the customer may purchase the product with a credit card and arrange to have it shipped to their home or workplace.

A known problem in the retail industry is when inventory is out of stock, resulting in a lost transaction. When dealing with out of stock (OOS) items, small retailers specialize in suggesting related and replacement items from their existing inventory. For example, a customer who comes in looking for a pink dress shirt may be directed to a similar shirt when the one they seek is unavailable. A tie may also be selected and offered to the customer, to try to upsell the customer. This results in fewer lost sales opportunities due to out of stock merchandise and significant upsell results.

In the e-commerce industry, upselling is usually driven by products that other people have purchased in conjunction with a product of interest. Though historically driven product suggestions are useful in driving sales, they are less effective than, for example, a salesperson's suggestion of upsell items. In some categories of online sales, unavailable products also remain a significant problem. Of course in those categories, product suggestions are even more problematic. When suggested products for out of stock items or upselling are determined based on images, the current image search technology provides very poor search results with many of the displayed images representing unrelated content, and the limited processing speed relegates relevance based image search engines to desktop applications where collections are limited in size.

Accordingly, an improved system and methods that enable classification and searching of images in an efficient and accurate manner remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
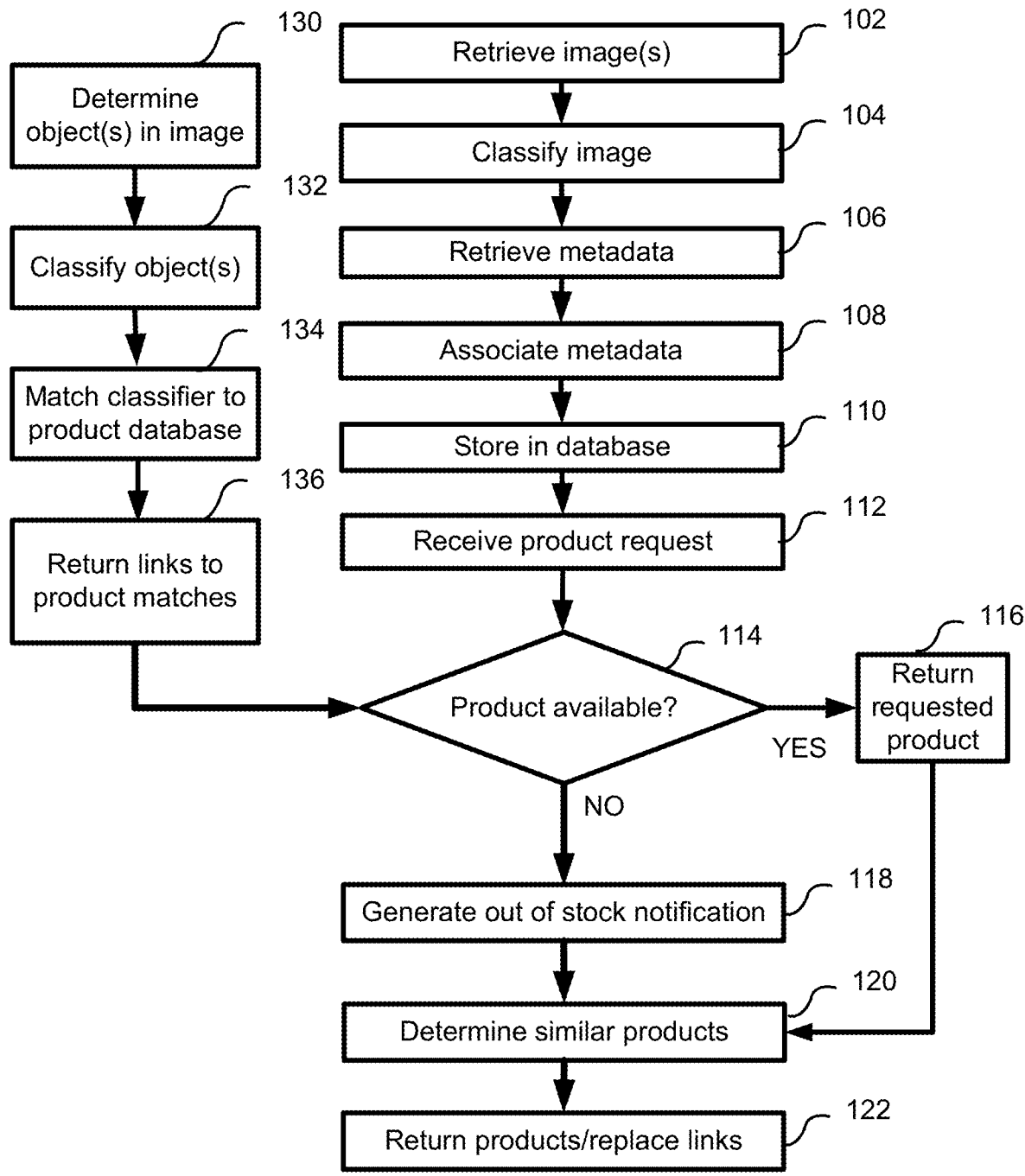
FIG. 1 is an overall method for using image classification and searching for returning e-commerce product requests.

One embodiment of the present disclosure provides a method for classifying images, comprising: retrieving a product image from a first database, wherein the product image corresponds to a product; performing, with at least one processor, foreground detection on the product image; generating one or more classifiers for the product image in accordance with a set of instructions stored on a memory that is operably connected with the at least one processor from feature descriptors determined from the product image; determining an image object category and attributes from the generated one or more classifiers; associating product metadata with the determined image object category and attributes and a product definition; and correlating a plurality of product definitions having similar image object category and attributes; wherein product definitions from the plurality of product definitions can be presented when out of stock indicator for an associated image is identified based upon the image object category and attributes.

Another embodiment of the present disclosure provides a method for searching for and correlating product images, comprising: receiving a request from a customer to purchase a first product that corresponds to a first product identifier; querying a first database with the first product identifier; determining, using at least one processor, one or more additional product identifiers stored in the first database belonging to a same classification as the first product identifier from classifiers of one or more images of the first product when an out of stock identifier is associated with the first product; retrieving, using the at least one processor, one or more additional product images corresponding to the one or more additional product identifiers; retrieving one or more sets of product metadata corresponding to the one or more additional product identifiers; and generating an output of product recommendations that comprise the one or more additional images and one or more additional product metadata.

Yet a further embodiment of the present disclosure provides a system for classifying, searching for, and correlating images, comprising: a server configured to receive product requests from a customer, a first database for storing product images, and operably coupled to the server; a second database for storing product metadata, and operably coupled to the server; a third database for storing product identifiers based on classification, operably coupled to the server; a recommendation engine operably coupled to the server, wherein the recommendation engine is configured to determine a product availability and to return results comprising products that are similar to the received product request; and an imaging server operably coupled to the server, wherein the imaging server is configured to classify product images stored in the first database based upon feature descriptors of the images, retrieve product metadata from the second database to associate with the product images, and generate a product identifier for storage in a third database.

Other aspects and features will become apparent to those ordinarily skilled in the art upon review of the following description of specific embodiments of the disclosure in conjunction with the accompanying figures.

The following description is presented to enable a person skilled in the art to make and use the described subject matter, and is provided in the context of a particular application and its requirements. Various modifications to the disclosed embodiments will be readily apparent to those skilled in the art, and the general principles defined herein may be applied to other embodiments and applications without departing from the scope of the disclosure. Thus, the present disclosure is not intended to be limited to the embodiments provided, but is to be accorded the widest scope consistent with the principles and features disclosed herein.

A stock keeping Unit (SKU) identifier is an intended unique identifier of a product. A product description page (PDP) describes a product associated with a SKU and allows for the purchase of one or more products, or for addition of the one or more products to a shopping cart tied to the customer's session. Most PDPs are associated with at least one SKU relating to the one or more products allowing the SKU to be used to search within a database of PDPs.

Affiliate marketing is a process of marketing by an affiliate products that are sold through online retailers other than the affiliate. In many affiliate marketing instances, the affiliate is paid a commission for referring a customer to an online retailer. The affiliate facilitates the on-line transaction through their website but does not maintain the inventory provided by the retailer. Affiliate websites maintain a product database and provide shoppers with an alternate method to discover and review products, and an interface through which those products can be purchased. They typically redirect a customer to a location where the purchase transaction can be completed directly with the online retailers. An example of affiliate marketing are photo sharing websites where users can upload photos which can subsequently be linked to retailer sites to facilitate transactions. The products may not necessarily be exact matches to the product in the photos but rather be similar products in appearance which may be offered by multiple retailers.

Referring to FIG. 1, an overall method 100 for using image classification and searching for returning e-commerce product requests is shown, which may be implemented by either direct online retailers or by affiliate sites such as for example on-line photo sharing websites where consumers can post images which can be indexed and mapped to retail products. The first part of the method relates to populating a hierarchical database for product images, which may then be in turn be used for handling e-commerce product requests in the second part of the method. The method 100 begins by retrieving an images of product from a database (102). The images are then classified (104) using image recognition techniques which will be described in more detail in connection with the subsequent figures. Metadata for the product is retrieved (106) and associated with the respective image (108). A product identifier for the images with associated metadata is generated and may be stored in a hierarchical database (110).

When an online shopper selects a product to purchase, the product request is received (112) and it is determined if that product is available in stock (114). If the product is available (Yes at 114), the requested product is returned (116). If the product is not available (No at 114), an out of stock notification is generated (118), which may or may not be presented to the user depending on the website configuration but may be used to determine how alternatives for product selection are utilizes when determining similar product matches. Similar products may then be determined (120) using the product identifier based on the image classification and associated metadata previously stored in the database (110). Alternatively the object classifiers may be used to determine product identifiers if the object in an image has not been previously associated with a product identifier. Even if the requested product is available (Yes at 114), similar products may still be determined (120) to show the customer what alternative products may be available as well, or for upsell purposes. Lastly, the products are returned and displayed to the customer (122) or links associated with the image may be replaced to redirect to available products in for example a photo sharing website. The method may also include classification of images to determine objects within the images and matches to the product database, for example in a photo sharing website, Uploaded images can be analyzed to determine objects present in the image (130) which may be matched to retailers and links associated with the objects. The links provide HTML identifiers to be associated with an object in an image and direct a user to a retailer or re-direct page when the object is selected. Each object is then classified (132) and matched to the product database (134). The images may be matches to one or more products depending on the application, inventory, price, retailer, or ranked next to products having the most similarity. HTML links can then be generated to the retailer for each identified product and matched to the image to allow subsequent selection of a user (136). In the event that a product is out of stock the links associated with the image can be replaced with similar products links as required. Alternatively existing links to products may be dynamically replaced based upon the stock indicator values based upon object matches. In addition the product classification can be utilized to enable out of stock matching to similar products within a retailer inventor or across retailers.

Figure 2:
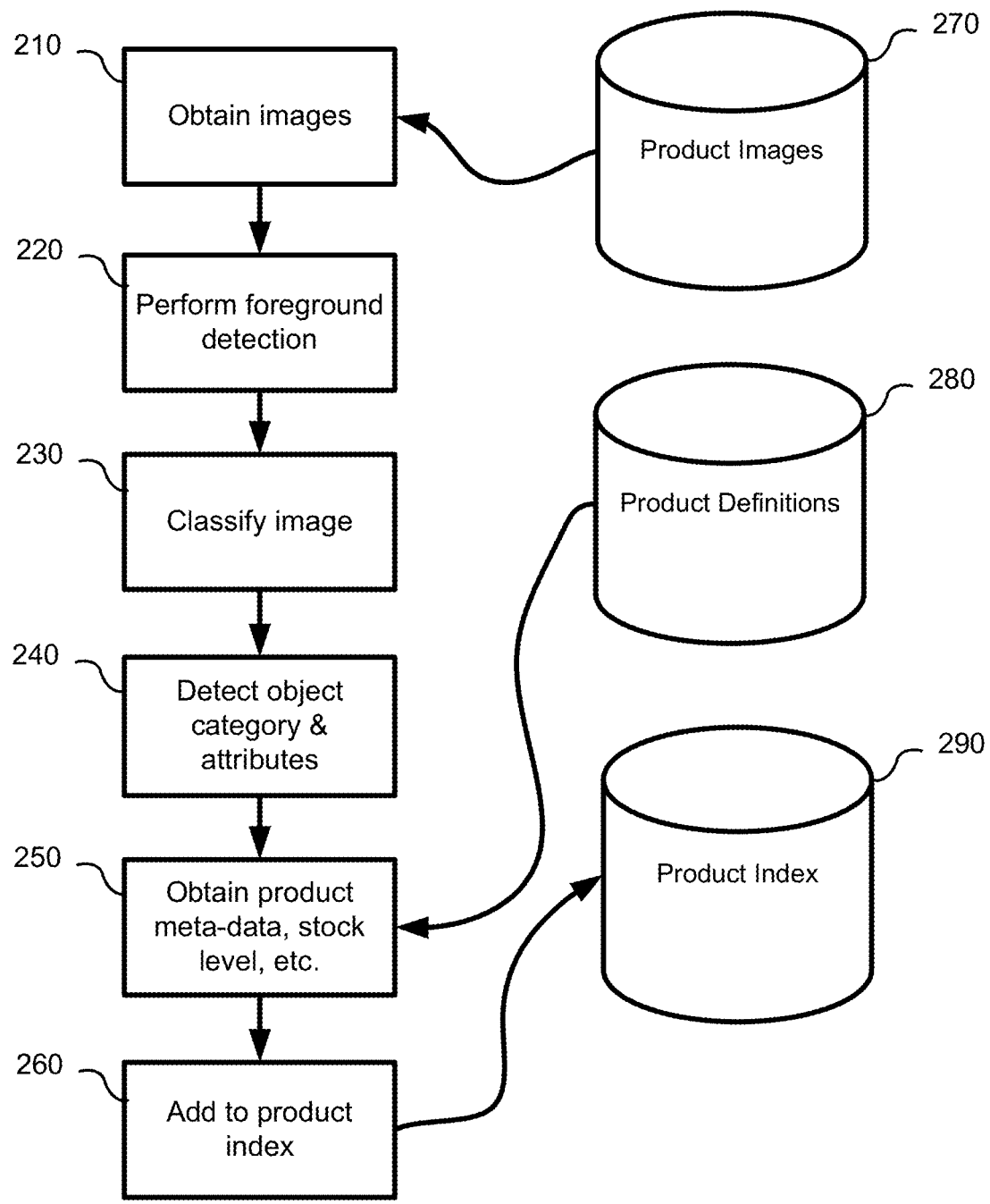
FIG. 2 is a simplified flow diagram of a method of creating a product index.

Referring to FIG. 2, a simplified flow diagram 200 is shown for a method of image correlation in a data set of images by creating a product index—this is the first part of method 100 previously described. One or more images are provided (210) for example, the images are retrieved from a Product Image database 270 that may contain product images that a direct retailer offers, or may contain product images from various retailers that an affiliate site represents, or be provided by users in a photo sharing website and may contain one or more products that can be mapped to different vendors and potential retailers. For each image, foreground detection is performed to identify objects or portions of each image that are in the foreground (220). Once foreground portions are identified, the images are classified (230). The image classification is used to determine object category type and attributes (240). This allows for retrieval of product metadata and stock level data (250). For example, this information may be retrieved from a Product Definitions database 280. An identifier for the product image and associated metadata is then added to the Product Index database 290 (260). Thus, for each product image an index entry is created, which provides an image database for use in searching of products based on their images or similar images. The image may also be divided into multiple classification is multiple products are present. Alternatively the image may be sub-divided to identify unique individual products within the picture.

For each image a data entry is formed for use in correlating the images and for correlating the images with newly provided images. The data entry in the Product Index database 290 forms a classification of the image. In its simplest sense, the data entry may be a class such as shoes, a subclass such as loafers, and so forth along with other extracted data on classification all associated with the image and with a SKU. Accordingly, the Product Index is a hierarchical database. As the classification is numerical in nature, it need not correlate to human intelligible classifications. When another identical image is provided to the system, it classifies the image the same way and therefore pulls up the same entry within the database.

In contrast to a typical keyword or metadata based image search engine, computer vision systems have become quite adept at recognizing objects that they have already seen, but the more general task of recognizing a class from a limited number of instances has proven somewhat elusive. Since the primate visual system outperforms all existing computer vision systems, it is reasonable to look towards biology for inspiration in this problem. Biologically inspired work has produced a number of models that compete with the top computer vision systems. These models aim to replicate the lowest levels of the visual cortex and generally place a great deal of focus on visual features. Much less focus has been given to the problem of developing a biologically plausible classifier. Existing models have been implemented on Single Instruction Single Data (SISD) processors, but given the highly parallel nature of the human brain, a more parallel processor is clearly required to achieve the high performance of the visual cortex. The adoption of highly parallel programmable Single Instruction Multiple Data (SIMD) processor programming architectures in applications such as Graphics Processing Unit (GPU) has provided an inexpensive architecture for emulating the highly parallel nature of the human brain.

The cells in the lowest level of the visual cortex can be thought of as performing a number of operations that are fundamentally Single Instruction Multi Data (SIMD) in nature. The lowest areas of the visual cortex are retinotopic, meaning that local regions of cells all perform identical operations on different regions in the visual field. This means that adjacent cells process adjacent regions of the visual field, which is the very definition of an SIMD process. At the lowest areas the operation is a convolution operation which continues onto various forms of pooling mechanisms to construct higher order visual features.

A crucial aspect of object recognition, which is important for image classification and searching, is that many object classes cannot be recognized using only small, isolated regions of the image. The importance of pooling simple features in more complex features is clear. It is therefore important to find an effective method of grouping local feature descriptors that belong to the same object together; ideally each descriptor should be aligned with the intrinsic geometry of the object in question. By grouping descriptors and determining multiple classifiers for each image a hierarchical database (e.g. the Product Index 290) can be created that enables fast and efficient image classification and search results.

Figure 3:
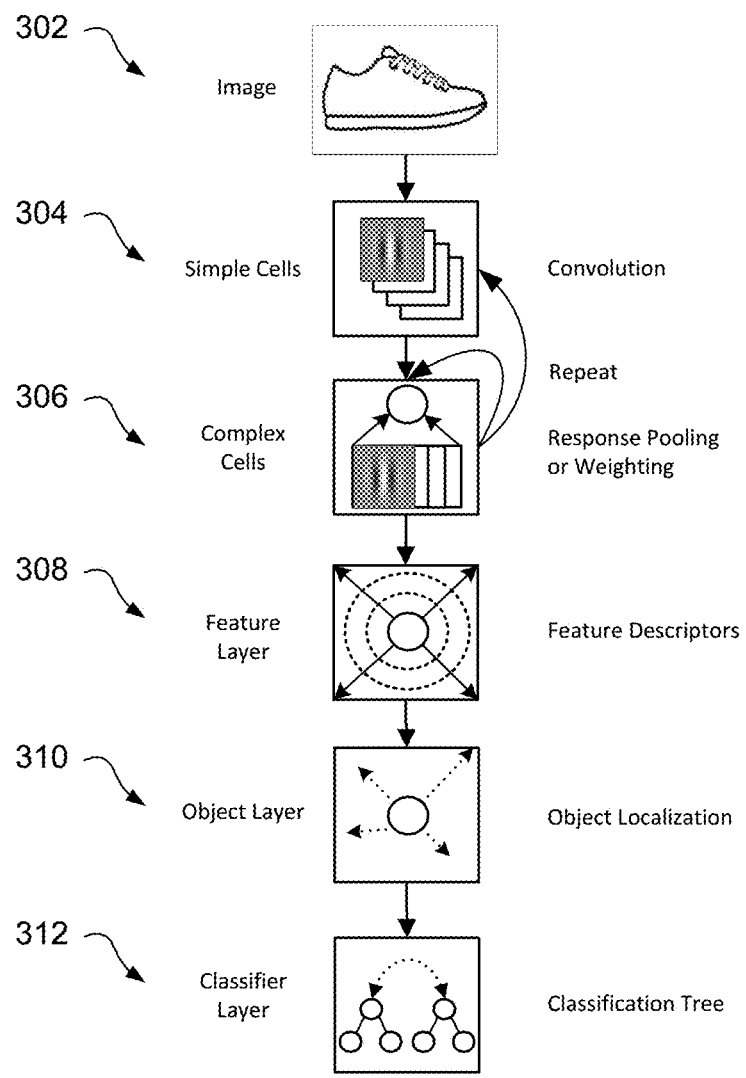
FIG. 3 shows a schematic representation of image classification and localization model.

Due to the inherent incompatibility between most SISD and SIMD algorithms, many existing models cannot be used to enable a biological based image search system. The image classification starts with V1 simple and complex cells, as shown in FIG. 3, which provides a schematic representation of an image classification and localization model 300. Simple cells perform convolution operations with Gabor or Gabor-like filters on a received image. Complex cells perform higher order tasks, including pooling simple cell responses at a given orientation. Simple and complex cells are alternated with arbitrary level of complexity; their receptive fields gradually grow in size and the final configuration is known as a Cellular Neural Network.

By formalizing the role of hypercomplex cells within V1 and V2 a more effective model can be constructed. This feature descriptor is built around several key anatomical structures. The first of which is simple and complex cells, which are applied in an alternating fashion that is equivalent to the cells used in other models. FIG. 3 shows the data flow within the system starting with the input pixels of an image, all the way to a usable detection and classification of an object in an image. The process begins with a series of convolution-like image processing operations, which mimic the Simple Cells located in the visual cortex, whose output is used to generate higher order invariant structures which culminate in feature descriptors related to specific object classes, which are then used to detect and classify specific object types.

FIG. 3 shows illustratively the layers of an image classification and search model. An image 302 is acquired by the system representing a product such as a clothing item. The image may be presented in any number of image formats such as .JPG, .GIF, .RAW or may be a selected from a multimedia file such as .MPG, .AVI, .MOV, etc. Any computer definable image format may be utilized for processing by the system.

Simple Cells Layer (304)

The V1S layer 304 is computed either directly from the image 302 or from the retinotopic output from a previous pooling step (306) with a convolution using 2D Gabor or Gabor-like filters over a range of parameters. An example of a possible Gabor filter is described:

$$C_S(\theta, x, y) = \exp\left(-\frac{x_1^2 + \gamma^2 y_1^2}{2\sigma^2}\right) \cos\left(2\pi \frac{x_1}{\lambda} + \psi\right)$$

$$x_1 = x \cos(\theta) + y \sin(\theta)$$

$$y_1 = y \cos(\theta) - y \sin(\theta)$$

Where
σ and λ are related by a bandwidth parameter, b.
Sample parameters used in the system range from the values shown in Table 1.

TABLE 1

| Parameter | scale | θ | ψ | b | γ | λ |
|---|---|---|---|---|---|---|
| Value Range | [5, 31] | [0, 2π] | $[-\frac{\pi}{2}, \frac{\pi}{2}]$ | [0.2, 3.0] | [0.0, 3.0] | [0.0, 6.0] |

After the convolutions are completed, complex cells perform a pooling operation over a retinotopically local cluster of simple cells within the complex cell receptive field, $\sigma_{RF}$. The pooling is modeled with a MAX operation.

Complex Cells Layer (306)

The Simple Cell Layer 304 performs its operation on local areas within the visual receptive field, but since an object can take up any (and arbitrary) amounts of the visual field, it's important that the system is able to take into account a broader set of input at later stages of the data flow. The visual cortex has been observed to have a gradual broadening of perspective as the input transfers to cells in the later stages. There are many types of Complex Cells possible, one of which is done using a MAX operator. The MAX operator simply selects the most active input from its retinotopic receptive field. The receptive field for any MAX pooling Complex Cell is configurable, so it can be adjusted as necessary depending on the depth and configuration of the overall Cellular Neural Network.

The output from the Complex Cell Layer 306 can then be sent onto either 1) another Simple Cell Layer, 2) another Complex Cell Layer, or 3) the Feature Descriptor Layer 308. The fact that the output from Complex Cells can be chained to one another and passed back to Simple Cells makes this a type of recursive data processing method. The functional logic behind the decisions of what parameters to be used at each step in the recursive process, as well as when to halt, are defined a priori. This parameter set is known as the Cellular Neural Network Definition. Any number of potential configurations is possible in a Cellular Neural Network Definition, reaching any depth from two layers, up to hundreds or more layers.

It is of note that a variety of operations can be included as Complex Cells, such as weighted all-to-one connections, and other pooling type operations that are typically seen in classic neural nets. Another type of Complex Cell is a MAX classification cell, i.e. a cell that maintains a set input connections that are weighted, and then it simply assigns a label to the input with the highest weighted activation, thus assigning a classification output for the given input. Common neural net training methodologies, such as back-propagation, can also take place within the Complex Cell structure.

Feature Descriptor Layer (308)

Once the Simple/Complex Cell computation process has terminated, as per the network's Cellular Neural Network Definition, the resulting output is a set of values that represent a set of retinotopically local areas within the input image. These types of structures are known as Feature Descriptors, and are able to be used at higher levels for a variety of useful tasks, such as locating an object or classifying the object and/or its sub-attributes. Later classification or localization tasks can also make use of other Feature Descriptors from separate Cellular Neural Network Definitions. This layer simply formalizes that there is a structure output of pre-determined size, as per the network's Cellular Neural Network Definition.

Object Layer (310)

The Feature Descriptor Layer 308 is able to represent a variety of important aspects of an image, but before this can be put to use, it is essential to know what part of the image represents the bounds of an object of interest, i.e. where the object's contour starts and ends. The features from all levels of computation in the Cellular Neural Network Definition can be used to propose potential areas of interest in which an object could potentially be located. This type of operation can be thought of as a higher order type of Complex Cell Layer, i.e. a Complex Localization Cell Layers, that given an input image, both proposes and assesses regions in which the object is located. It is optimal when the proposed regions make use of the lower level Simple and Complex Cell Layer outputs, although other methods may be used.

Classifier Tree Layer (312)

The result of certain Cellular Neural Network Definitions results in a classifier being created; where Feature Descriptors can be used directly for classification tasks, for example to tell if an object region belongs to a shoe vs a bag. Any arbitrary classification is possible, composing any level of attributes about a given object. For example, a particular shoe may have high heel or low heel, and a Cellular Neural Network Definition can be made that emphasizes the heel portion of any localized shoe object once the classifier has determined that the region is, for example, a shoe and not a bag. These domain specific classifiers are chained in a tree-like fashion, such that certain sub-classifiers are run on the relevant image regions once higher level classifier determines that it is a relevant selection. Generally, each sub-tree belongs to a common category and the training data is shared and split in relevant ways across the sub-classifiers. For example, shoes may have a variety of important classifiable attributes, such as heel type, lace type, material, function, and other things that separate shoes at a practical, visual level. Each classifier attribute within a sub-tree can be trained separately using a distinct Cellular Neural Network Definition in order to allow the network to fine-tune the attribute properties to the objects in question. This classification tree structure can be extended to any size.

One embodiment of the image classification and localization model 300 is that images for each product angle may be processed separately. In the non-limiting shoe example, a top view may classify feature descriptors based on laces, toe shape, etc., while a side view may classify feature descriptors based on the heel, arch, etc. These may be linked together by a single SKU to reduce the results.

Figure 4:
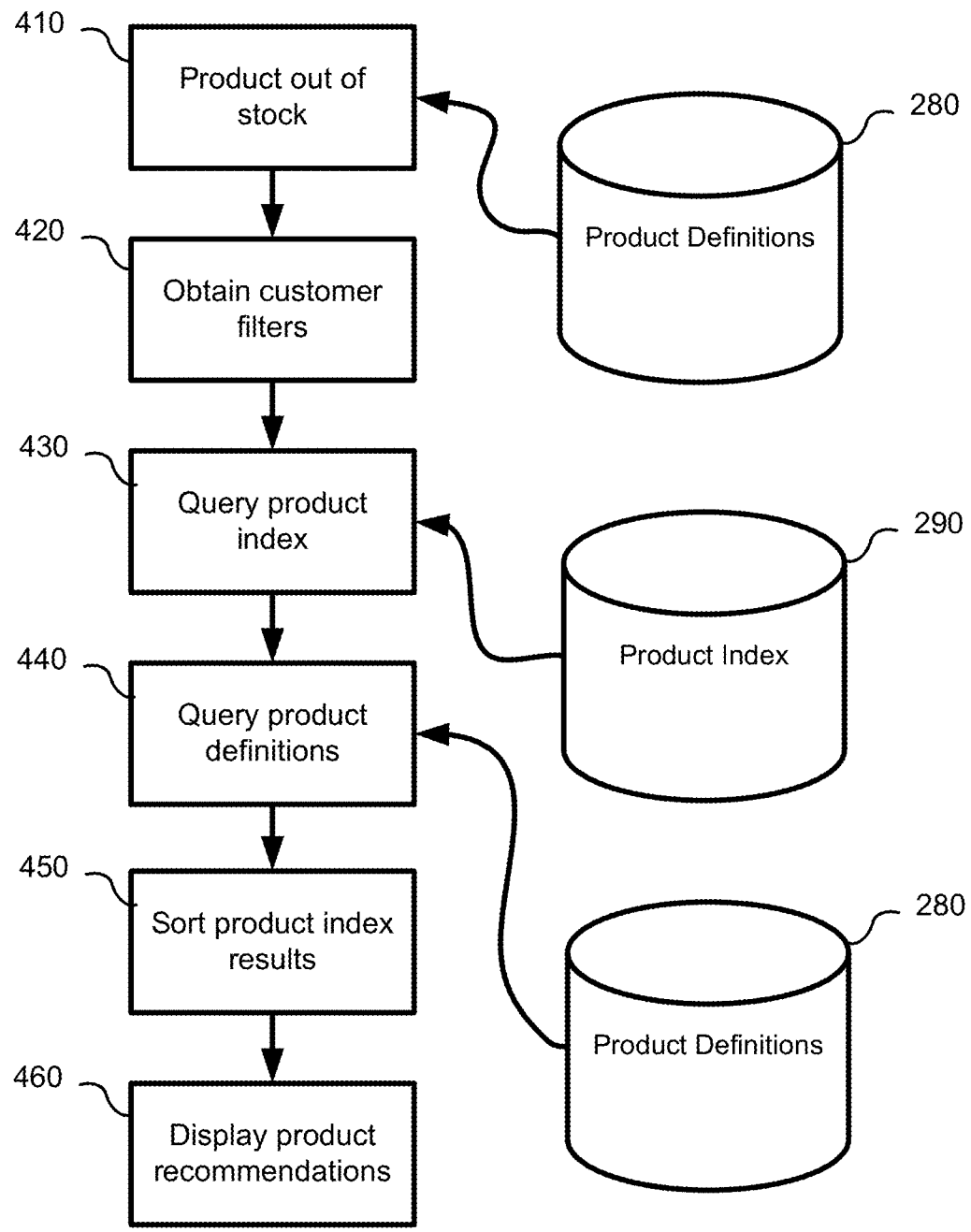
FIG. 4 is a simplified flow diagram of a method for responding to out of stock events.

Using image searching and classification, FIG. 4 shows a simplified flow diagram 400 for addressing out of stock product recommendations—this is the second part of the method 100 previously described. A product is detected as out of stock (410) relying, for example, on the Product Definitions database 280. The product definitions include unique product identifiers such as a Stock Keeping Unit (SKU) identifier, quantity of the product, origin of the product, price of the product, economic classification of the product, use of the product, construction material of the product, user ratings for the product, etc. Thus stock levels at the direct retailer, or at any of a number of retailers carrying the same product (in the case of affiliate sites) are assessable. Some products may only be available from a single retailer. Other products may be widely available. Products may have multiple SKUs for a product sometimes viewed as the same by customers, for example different sizes of a shoe or different colors of a product.

Detecting that a product is out of stock happens in any of a number of ways. For example, the online retailer may be queried and returns out of stock details. Alternatively, stock information for products may be maintained locally based on data collected from retailers. Further alternatively, retailers may push out of stock data into the data set as products sell out.

Next, customer filters are obtained (420). In some embodiments these filters are obtained directly from the customer. For example, size 10 for a shoe would allow filtering of results based on availability of size 10. Another filter of merit is price, for example under $200. Of course any number of filters is supported depending on the implementation and application. In another embodiment the user filters are based on user preferences. This might limit where a product comes from, the type or reputation of the seller, the price of the product, the size, the shipping time, etc. In some embodiments the user enters these preferences and in others the system learns them over time based on user behavior. In some embodiments, it is a combination of one or more of the user entering filter options, the user entering preferences and the system learning user preferences.

The Product Index database 290 is queried (430) using the identifier for the out of stock product to identify similar products that meet the user filter criteria. In some embodiments, there is no user filter data and the results of the query are based solely on similarity as classified within the Product Index database 290. Based on the results from the Product Index database 290, the Product Definitions database 280 may again be queried (440) to ensure that the products recommended by the Product Index database 290 are in stock. If not in stock, then those similar products would not be returned. Only the products determined to be in stock are then left within a resulting list of substitute products. Finally, the Product Index results are adjusted/sorted (450), and the recommendations are displayed (460). For example, they are sorted and limited to a displayable quantity. Sometimes sorting and limiting is not merely an issue of best to worst and then displaying the first five, but instead involves forming a suitable mix of displayed results. In some embodiments, the results show the best match, the cheapest match, and two or three matches selected for likelihood of being correct. For example, a Gucci® bag image is provided and the best match is a $99 bag from one retailer, the cheapest match is a $29 bag from another retailer and the other displayed options are similar designer bags costing $1,000 and a Gucci® bag costing $2,000, respectively. Thus the user can select between very similar choices in appearance, and similar choices in branding, quality and cost.

As previously described in method 100, similar products could also be determined and recommended even if the requested product is in stock. In this case, the method 400 may begin with the step 420, and the Product Index database 290 would be queried with the product identifier of the requested product.

In a further embodiment, a customer may request a product or similar products by providing an image to the retailer or affiliate site. For example, perhaps a customer is at a physical retail store and sees a shoe that they like, but it is not in their size. They could take a picture of the shoe with a camera on their mobile phone, and then query their favorite retailer or affiliate to see if they carry that size of shoe or similar shoes. In this case, the customer filters may be obtained (420) by classifying the image in accordance (220, 230, and 240) and the image classification and localization model 300. Accordingly, once the customer filters are obtained the Product Index database 290 could be queried to search for the product or similar products based on how the image sent by the customer was classified (430-460) as shown in FIG. 4. This example is non-limiting, and may be extrapolated to any variety of products. Instead of taking a photo of a product at a retail store, perhaps it could be a picture of a friend's shoe, or an image found online. In another example, the customer filters may be obtained both by classifying the product image and by obtaining filters directly from the customer.

Again, the above methods may be implemented by direct online retailers or affiliate sites. In some cases the affiliate site may have their own databases for Product Images, Definitions, and/or Index for the products that they offer. These databases may be separate for each affiliated vendor, such that if a product is requested and is determined to be out of stock, only similar products by that vendor will be searched for. Alternatively, if a product is requested and is determined to be out of stock, similar products may be searched for from any or all affiliated vendors. Still alternatively, the affiliated site may store all product information from all vendors in the same databases, or may group product data from certain vendors into the same databases. In another embodiment, the affiliate site does not store any of this information and immediately outsources the product request to the retailer. In such a case, the methods above would be performed by the retailer.

Figure 5:
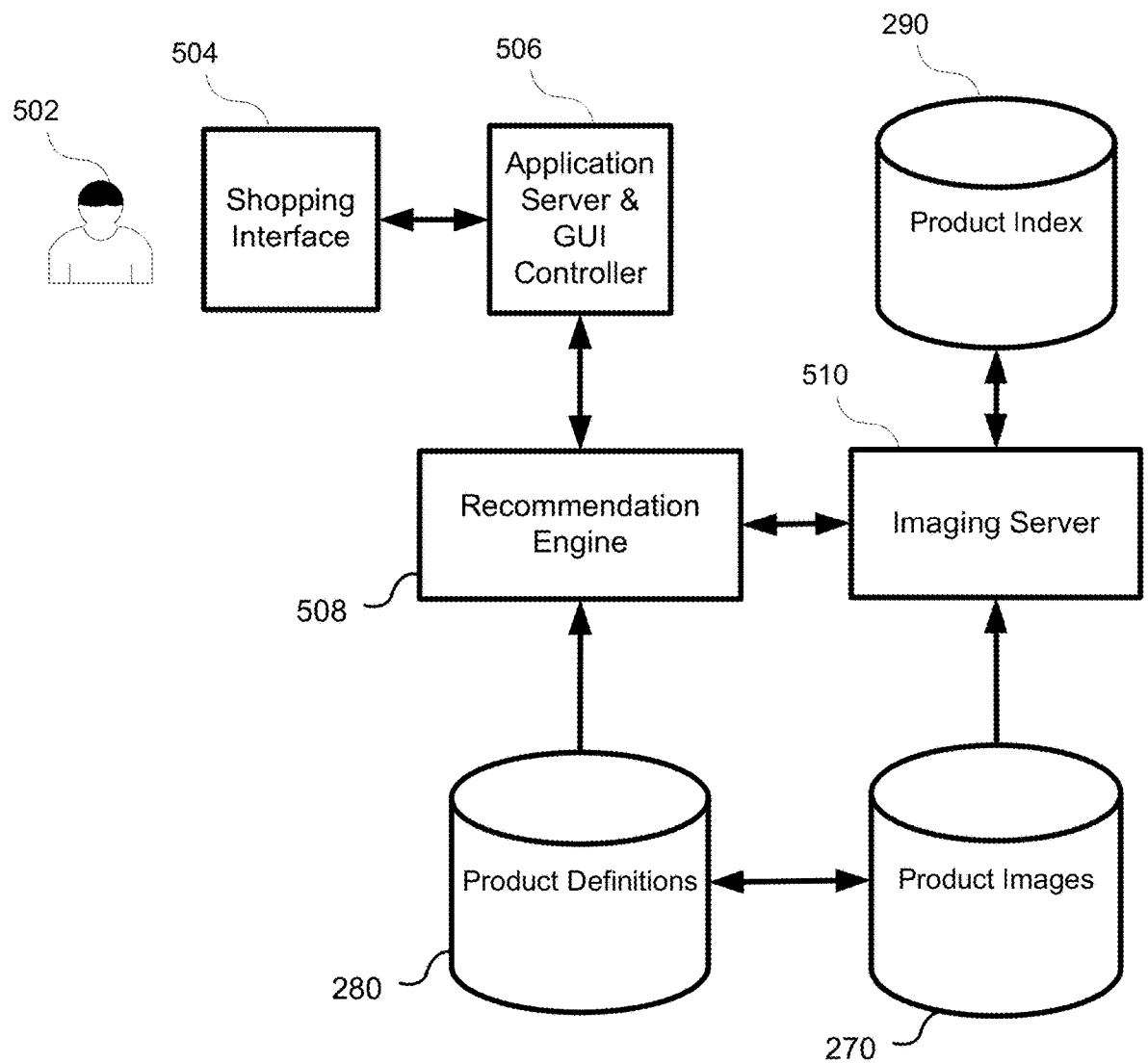
FIG. 5 is a simplified system diagram of a system for product searching and recommendation.

Referring to FIG. 5, shown is a simplified diagram of a system according to an embodiment of the disclosure. A shopping interface 504 is provided to a user 502. A user system supporting the shopping interface 504 thereon communicates with an application server 506 via a wide area network in the form of the Internet. The application server 506 communicates with a recommendation engine 508 to receive therefrom recommendations in response to user related shopping interactions. The recommendation engine 508 communicates with an imaging server 510 that retrieves information from the Product Index database 290 and the Product Images database 270. Product images are used to determine images that correlate and the product index is relied upon to provide product information relating to each product. The recommendation engine 508 also retrieves product definition data from the Product Definitions database 280 to define and describe products being recommended. In an embodiment of the methods described above, one example may be that when a product is requested by a customer, the request is sent to the recommendation engine 508. This determines if the product is in stock or not by pulling the product information from the Product Definitions database 280. If the requested product is out of stock (or it is in stock but it is desired to provide alternatives anyways), the recommendation engine 508 sends the product identifier and other customer filters to the imaging server 510, which can determine similar products from the Product Index 290 based on the image classification of product images previously performed. The product images of the suggested products (from the Product Images database 270) and the product metadata of the suggested products (from the Product Definitions database 280) may then be returned to the customer.

Figure 6:
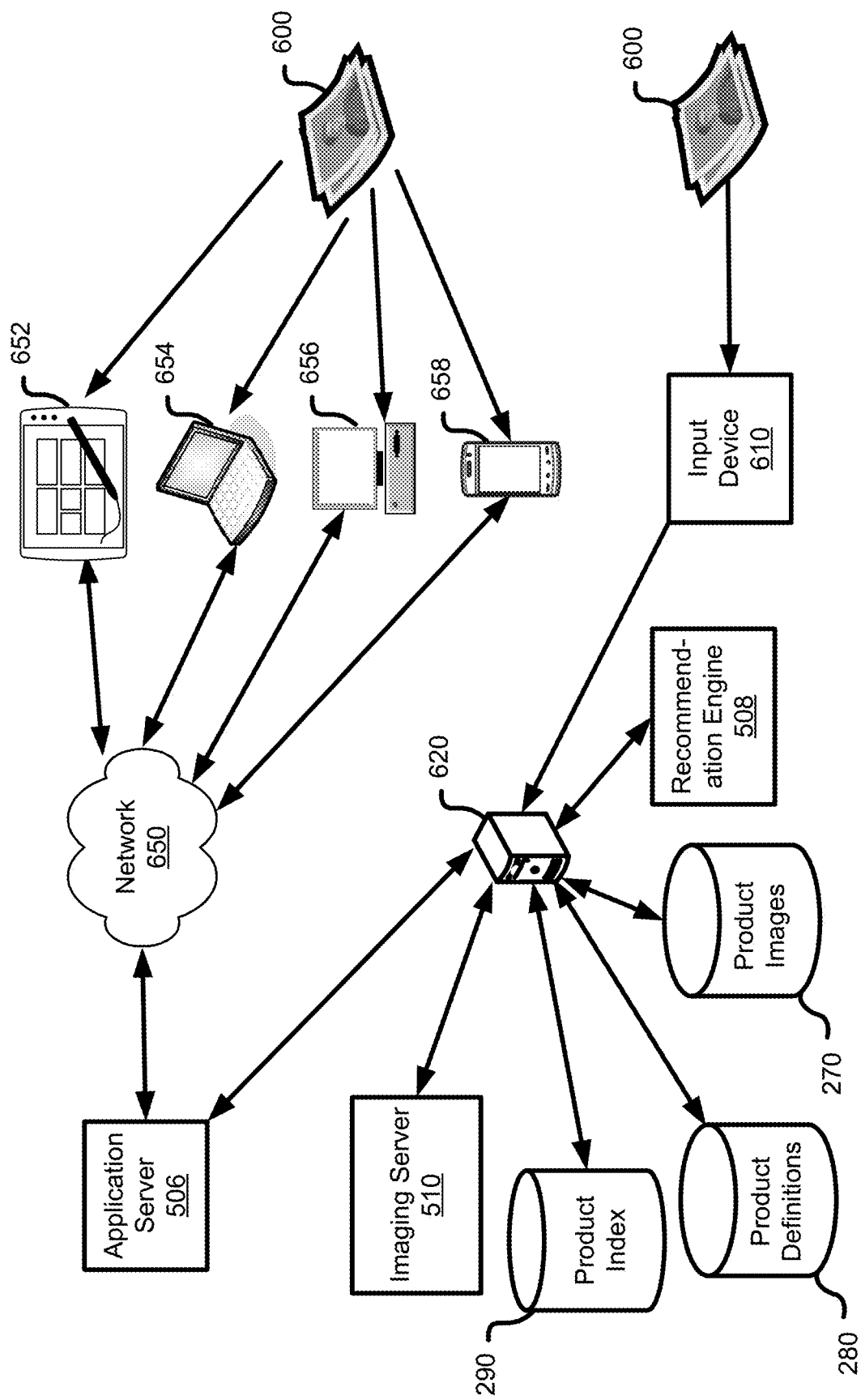
FIG. 6 shows an overview of a system for image searching.

FIG. 6 shows an overview of a system for image searching. Product images 600 can be stored or acquired from a number of locations or devices. In one embodiment, the product images 600 may be uploaded to a server/host 620 through an input device 610 such as a scanner or digital camera. The server/host 620 may be the same as the application server 506, or it may be different but operably coupled. The server/host 620 is a central hub that is operably coupled to the various databases and hardware used for image classification and search. The product images 600 uploaded to the server/host 620 are stored in the Product Images database 270. The imaging server 510 may then classify the images in accordance with method 200, calling upon the Product Definitions database 280 to provide product metadata and finally storing the indices in the Product Index database 290.

Customers may access the website interface on a plethora of digital devices such as tablets 652, laptop computers 654, desktop computers 656, smart phones or mobile phones 658, etc. The website interface accessed on such devices communicates with the application server 506 via a wide area network 650 in the form of the Internet. If a customer makes a request for a product, the availability of the product is determined from the Product Definitions database 280, and method 400 from FIG. 4 is carried out using the recommendation engine 508. The product may be selected from an image containing multiple products, such as a on a photo sharing website where an HTML link or hash redirects to a particular product or retailer offering the product available for purchase. The imaging server 510 may also be used depending on whether images need to be correlated to provide additional recommendations or alternatives, as described with respect to FIG. 5. Recall from method 100 that even if the requested product is available, method 400 may be used to recommend alternatives or to upsell the customer. The results from the request are then received and displayed at the digital device.

In addition the digital devices may include smartphones or cameras that generate images 600. As previously noted, in one embodiment a digital image may be acquired by a digital device, which may query the shopping interface to determine if the product in the image is available or if there are alternatives. The received images that are provided by the user or uploaded by other users on a photo sharing web site can are classified to identify objects within the image. An image may contain multiple items which are each identified and classified. An image may therefore be associated with multiple products and associated SKUs.

Figure 7:
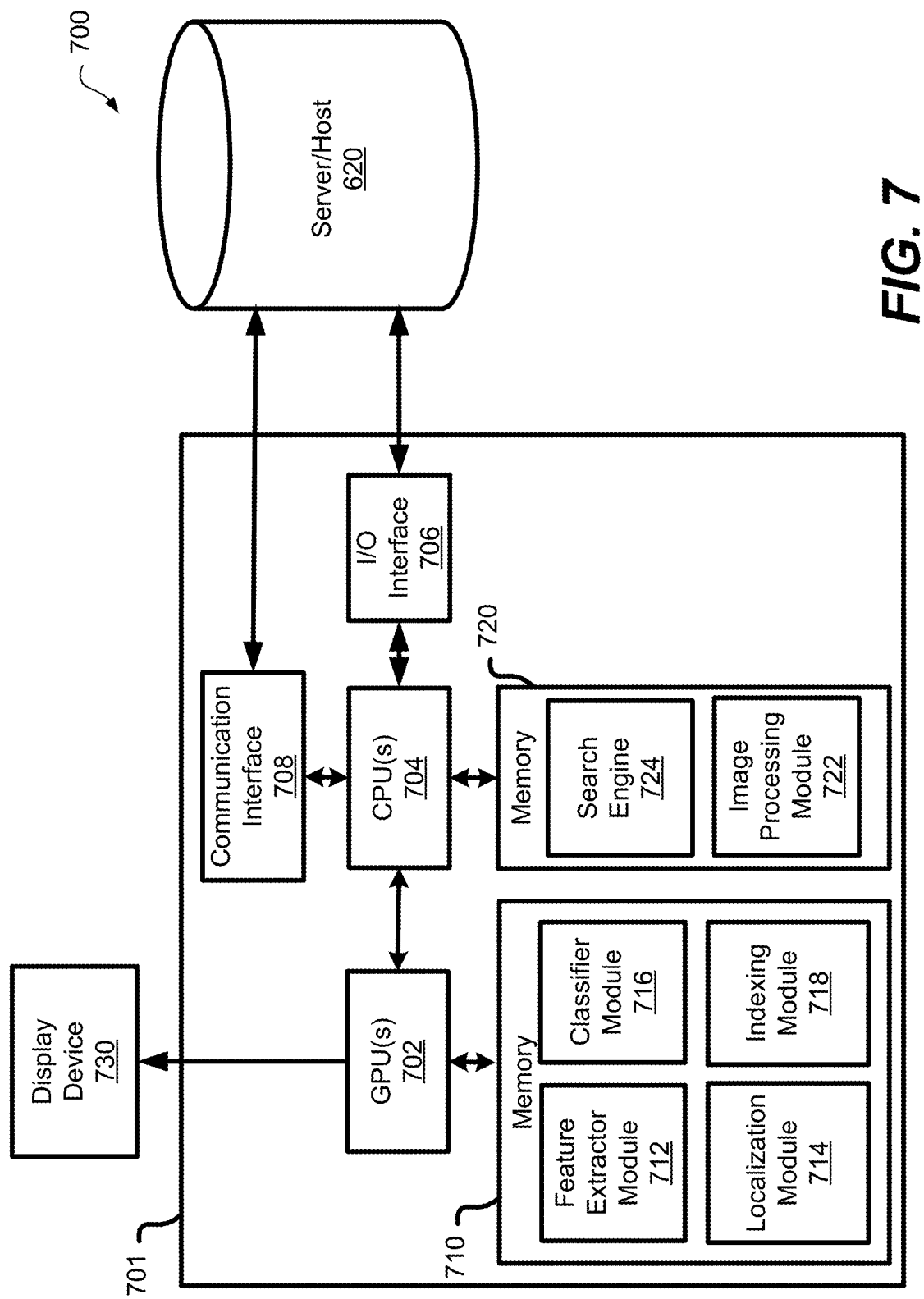
FIG. 7 shows a system for image classification and search.

FIG. 7 shows a computing environment 700 in which image classification and search may be implemented as computer software in the form of computer readable code executed by a one or more processors for image processing applications. In an embodiment, the computing environment comprises the imaging server and recommendation engine. The computing environment 700 may be any number of computing or computer based platforms such as servers, mobile devices, personal computers, notebook computers, personal digital assistants. A computer 701 comprises central processing unit (CPU) 704 and associated memory 720, and graphics processing unit (GPU) 702 and associated memory 710. The CPUs 704 and GPUs 702 may be a single processor or multiprocessor system for executing SISD or SIMD operations. In various computing environments, memory 710 and 720 and storage 770 can reside wholly on computer environment 700, or they may be distributed between multiple computers.

Input devices such as a keyboard and mouse may be coupled to a bi-directional system bus of a computer 701. The keyboard and mouse are for introducing user input to a computer and communicating that user input to processor 704 if required. Computer 701 may also include a communication interface 708. Communication interface 708 provides a two-way data communication coupling via a network link to a network by wired or wireless connection or may provide an interface to other host devices by a direct radio frequency connection. In any such implementation, communication interface 708 sends and receives electrical, electromagnetic or optical signals which carry digital data streams representing various types of information. The communication interface 708 may be operably coupled to the server/host 620 to communicate with the Product Images, Product Definitions, and Product Index databases. GPU 702 may be coupled to a display device 730 for displaying results or data related to search results or execution of the image processing or search engine.

Communication between the communication interface unit 708 and the network or host use electrical, electromagnetic or optical signals which carry digital data streams. The signals through the various networks and the signals on network link and through communication interface, which carry the digital data to and from computer. The computer 701 may also be able to display the results of the search to a user in the form of output if it is performed locally.

The CPU 704 or GPU 702 similar device may be programmed in the manner of method steps, or may be executed by an electronic system which is provided with means for executing for operation of the classification and search engine. The server/host 620 may also be accessed through an input/output (I/O) interface 706 and may include both fixed and removable media, such as non-volatile, flash, solid-state, magnetic, optical or magnetic optical storage systems, Random Access Memory (RAM), Read Only Memory (ROM) or any other available mass storage technology.

Memory 720 can provide code for providing high level operation of the classification and search system. An image processing module 722 provides a means of conveying images to the GPU 702 for processing in addition to receiving metadata from user input or by other association means. The image is processed by the GPU 702 connected to memory 710 which comprises a feature extractor module 712, a classifier module 716, a localization module 714 and an indexing module 718 which in combination provide the functions of the image processing layers. The search engine 724 enables an image query, either based upon an image or keywords to access the server/host 620 for retrieval of relevant images. Although the modules have been represented as being divided between CPU and GPU memory 710 and 720, they may be wholly executed by either processor.

Figure 8:
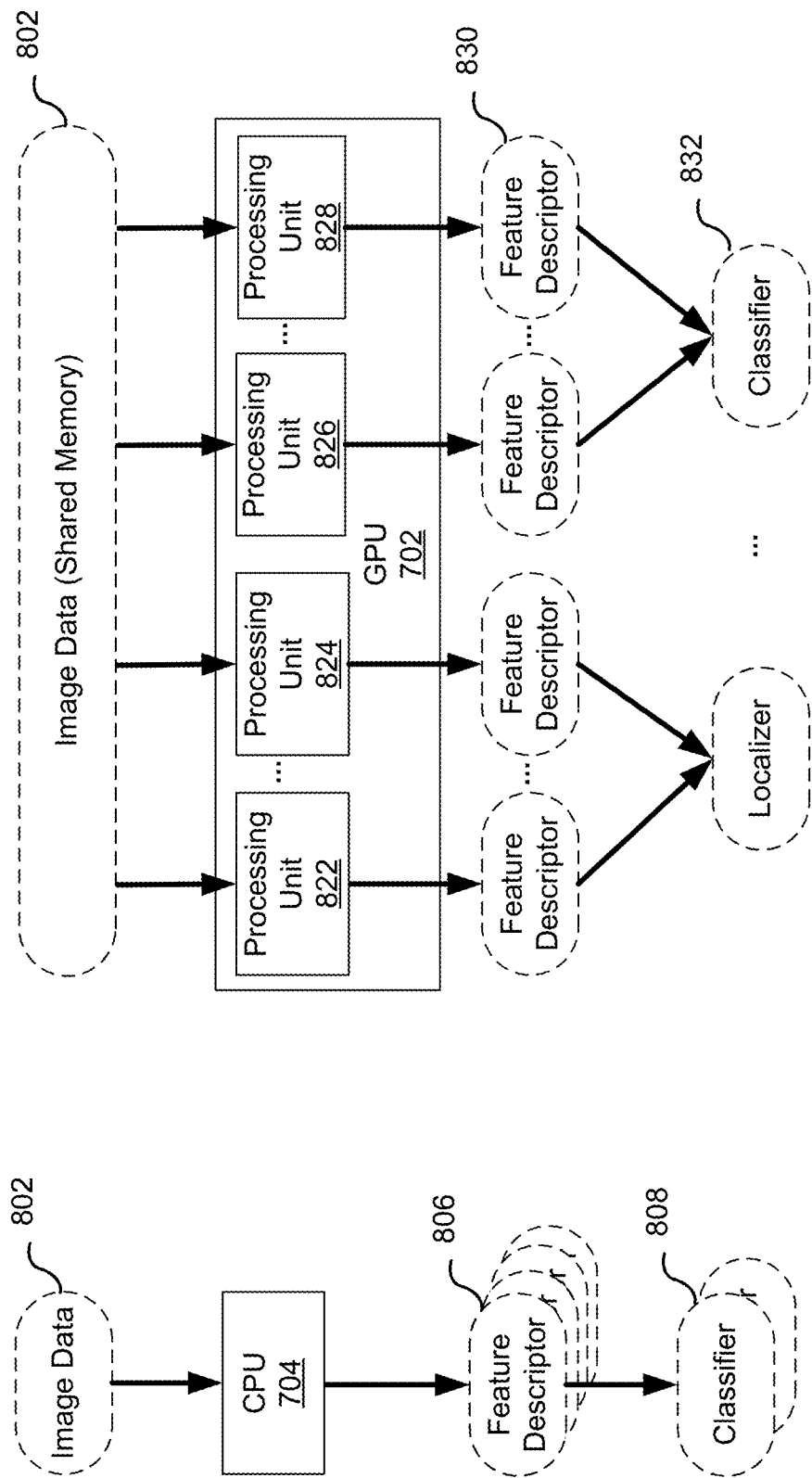
FIG. 8 shows a schematic representation of image analysis on GPUs and CPUs.

FIG. 8 shows a schematic representation of how the image classification and localization model may be performed on CPU 704 or GPU 702. In a CPU 704, operating in a SISD environment, each step of the execution of processing the image data 802 would be run serially. Feature descriptors 806 would be generated successively then appropriate classifiers 808 generated.

Modern programmable GPU 702 are fast becoming the ideal platform for large scale processing and provide SIMD execution. The GPU 702 is ideal for problems that are highly parallel in nature and can benefit from Single Instruction Multi Data (SIMD), Multi Instruction Single Data (MISD) or Multi Instruction Multi Data (MIMD) processing. Since the primate visual cortex operates in a retinotopic fashion, which is an inherently SIMD type of processing, the GPU is an ideal platform for modelling the visual cortex. All cellular processing, from feature descriptor isolation and comparison to object classification, can be implemented using for example OpenGL GLSL fragment shaders. When developing algorithms for the GPU 702, coprocessor bandwidth can become a significant bottleneck. It is crucial to minimize data transfer between the CPU 704 and GPU 702. Feature descriptors are only read from the GPU 702 after a hierarchical resonance (HAR) layer has been applied. At this point, the features for a given object class have been isolated and ranked. A subset of these ranked descriptors are selected for classification. This allows a uniform distribution of feature descriptors for each class. These descriptors are combined into a single texture for the classification shaders. In this example the image data 802 is provided in shared memory which can be processed in parallel by processing units 822, 824, 826 and 828 to generate feature descriptors 830 in parallel. Classifiers and localizers 832 can then be generated based upon the feature descriptors 830.

Figure 9:
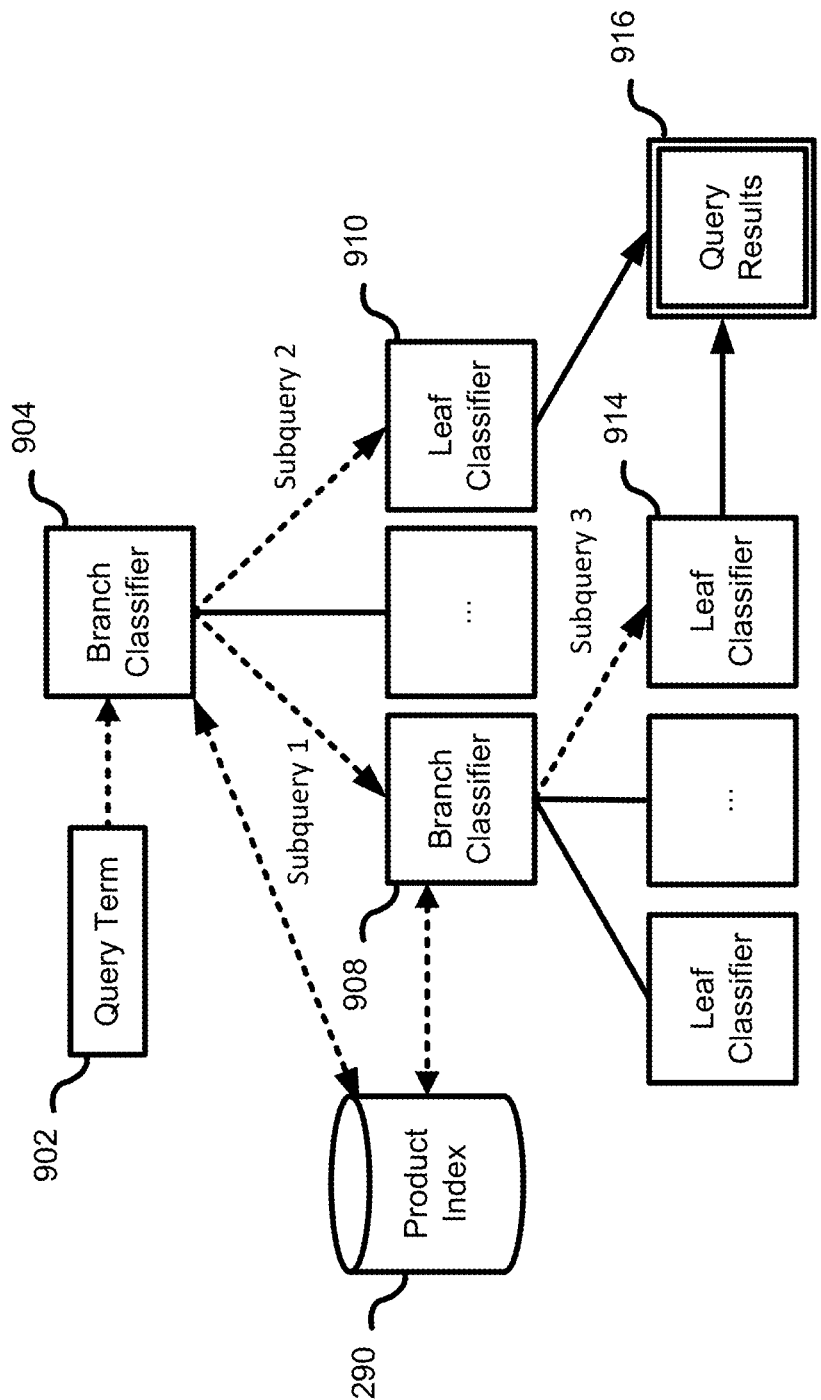
FIG. 9 shows a diagram of a tree of classifiers.

FIG. 9 shows a diagram of a tree of classifiers. For example, this classifier hierarchy may be used when querying the Product Index 290 with keywords obtained from customer filters. When a search is performed by the recommendation engine and imaging server, the keywords that are associated with the classifiers are mapped back to the query term 902. For example a high level term (such as 'men's shirts') can be associated with the main branch classifier 904. The additional terms that define subqueries such as subquery 1 (such as 'collars') which is mapped to a branch classifier 908 and subquery 2 (such as 'buttons') which is mapped to a leaf classifier 910. The branch classifiers 904 and 908 can be mapped with the Product Index database 290. In addition, dependent on the granularity of the branch classifier additional terms may be mapped based upon additional sub-query terms, such as sub-query 3 (such as 'striped') to further direct to a leaf classifier 914. Based upon the hierarchy in the Product Index 290, the images of similar products associated with leaf classifiers produces a query result 916 which can then be returned. Accordingly, this may be used to return results for similar products.

Figure 10:
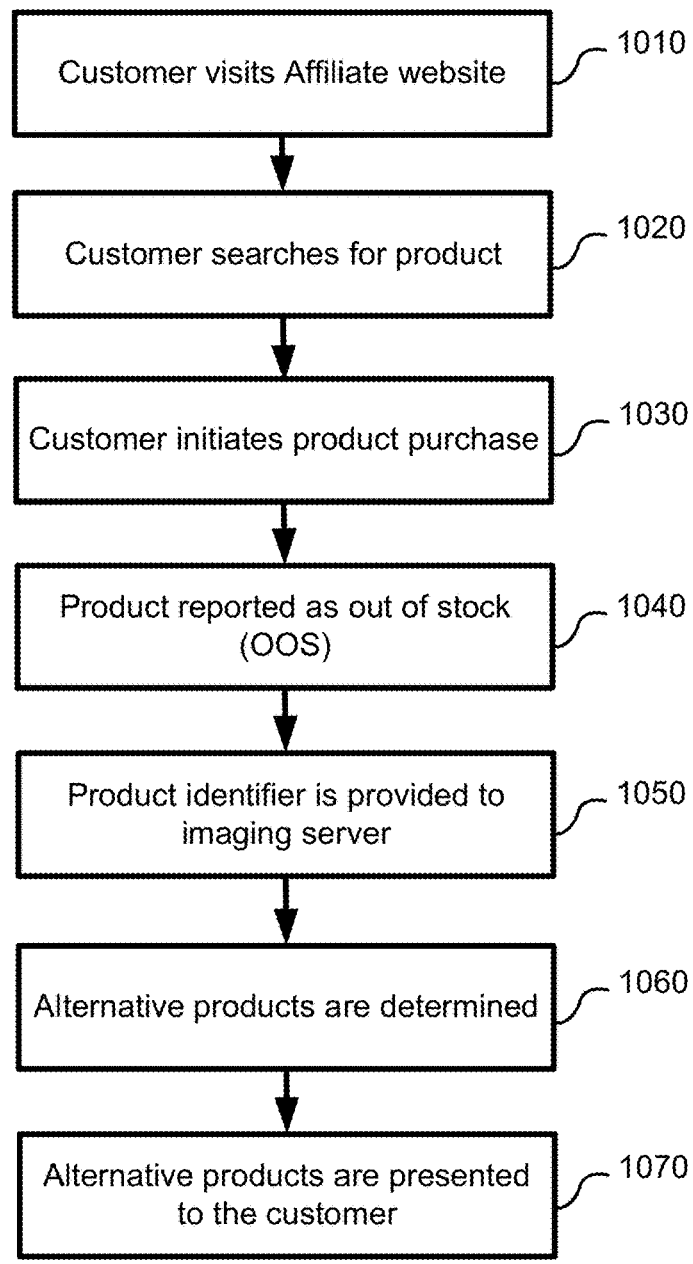
FIG. 10 is a simplified flow diagram of a method of addressing out of stock products by an affiliate site.

FIG. 10 shows a non-limiting flow chart example 1000 of how an affiliate site may implement the subject matter disclosed. A customer first accesses a shopping interface supported by an affiliate site (1010) and searches for products (1020). The affiliate site provides the product purchase request to the retailer (1030), where the product may be reported as out of stock (1040). The product identifier is then provided to an imaging server (1050), where together with the recommendation engine identifies alternative products using the method 400. Accordingly, alternative products are recommended (1060) and displayed to the customer (1070).

When the customer initiates a product purchase (1030) they may be redirected from the affiliate website to the online retailer. In one embodiment, out of stock products may be identified prior to this product request, and similar in-stock products may have already been determined (1050, 1060). Accordingly, the outbound links that would take a customer to a product page that is out of stock can be updated to point to the similar in-stock alternatives based upon image classifiers of the associated object. Alternatively items within an image may be processed to re-associate links with valid products particularly if links are to out of stock products.

In another embodiment, a customer may search for a product (1020) and select a corresponding image or select an item from an image photosharing website such as Pinterest™ (1030). However, perhaps the image actually contains multiple products. For example, the customer may be searching for a purse and select an image of a woman holding a purse but who is also wearing a dress. Using the image classification and searching methods described, all relevant products in the image may also be detected, regardless of where the image points, and the outbound link or links could be redirected to a relevant landing page on the retailer's site. For example, a customer may click the image of the woman holding a purse and wearing a dress, and is redirected to two landing pages: one for the purse and one for the dress. In an embodiment where perhaps that exact dress is not available, the image searching and classification could be used to find and recommend similar products, and subsequently direct the customer to those landing pages. This embodiment could be further applied in other non-limiting examples previously described where a customer queries for a product or similar products based on images taken on a digital device or found online.

Figure 11:
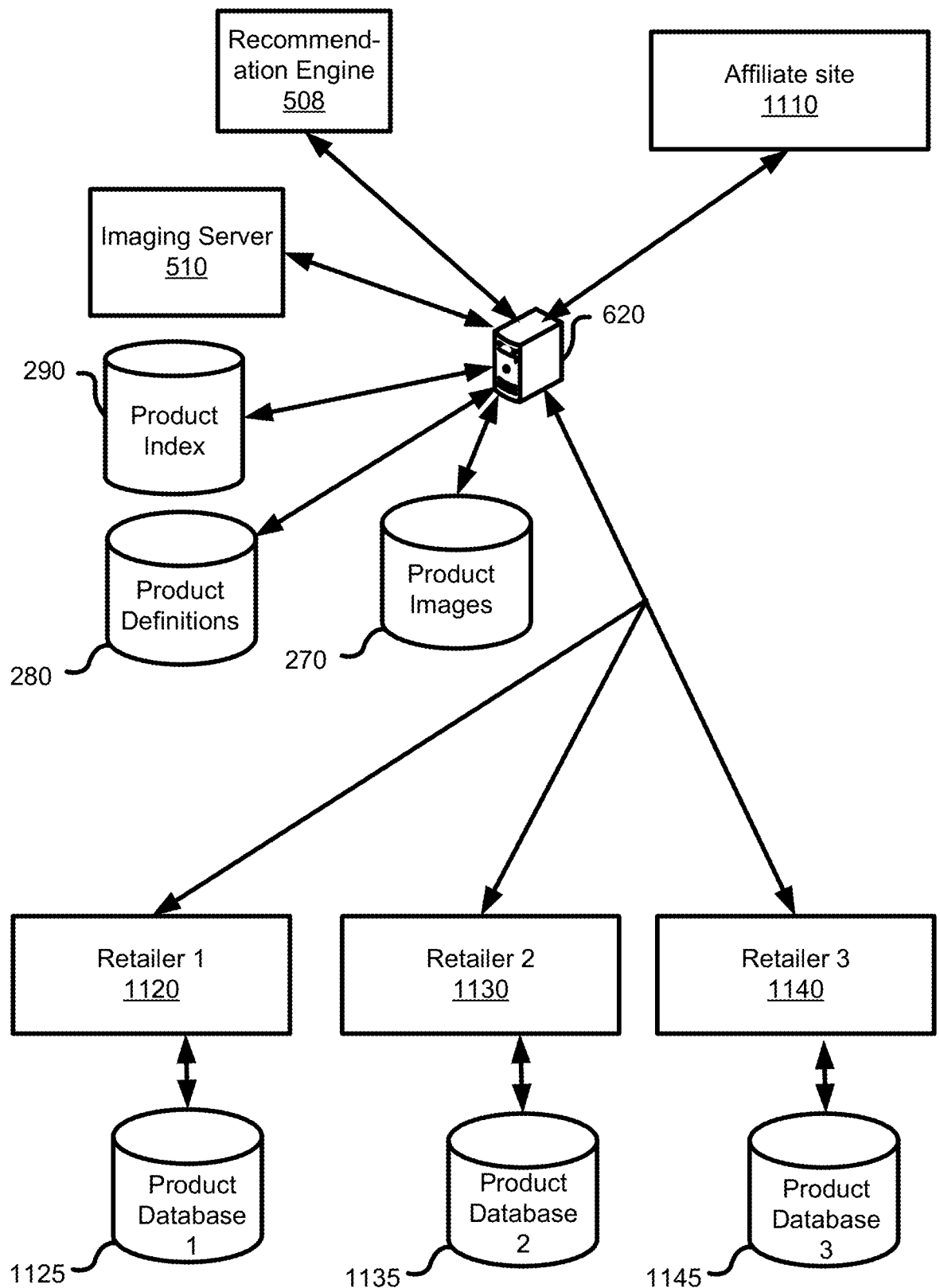
FIG. 11 is a simplified system diagram for a possible relationship between online retailers and affiliate sites.

FIG. 11 shows a non-limiting example of a possible relationship between affiliate sites and online retailers. In this example, the affiliate is using the server/host 620 where it may store product images in the Product Images database 270, product metadata and stock levels in the Product Definitions database 280, and product classifications and indices in the Product Index database 290. There may be a variety of online retailers using the affiliate site 1110. Each retailer 1120, 1130, 1140 may have their own product databases 1125, 1135, 1145. In this example, the retailers 1120, 1130, and 1140 are operably coupled with the server/host 620 of the affiliate site 1110. The server/host 620 receives product images and information from the retailers and may perform image classification and storage as previously described in method 200. When the affiliate site 1110 receives a request from a customer, it can provide alternative products if the requested product is out of stock, or to upsell the customer, using the recommendation engine 508 and imaging server 510. In some embodiments, if a product is found to be out of stock the request may be directed to the appropriate retailer to determine if there is any more of that product available.

Figure 12:
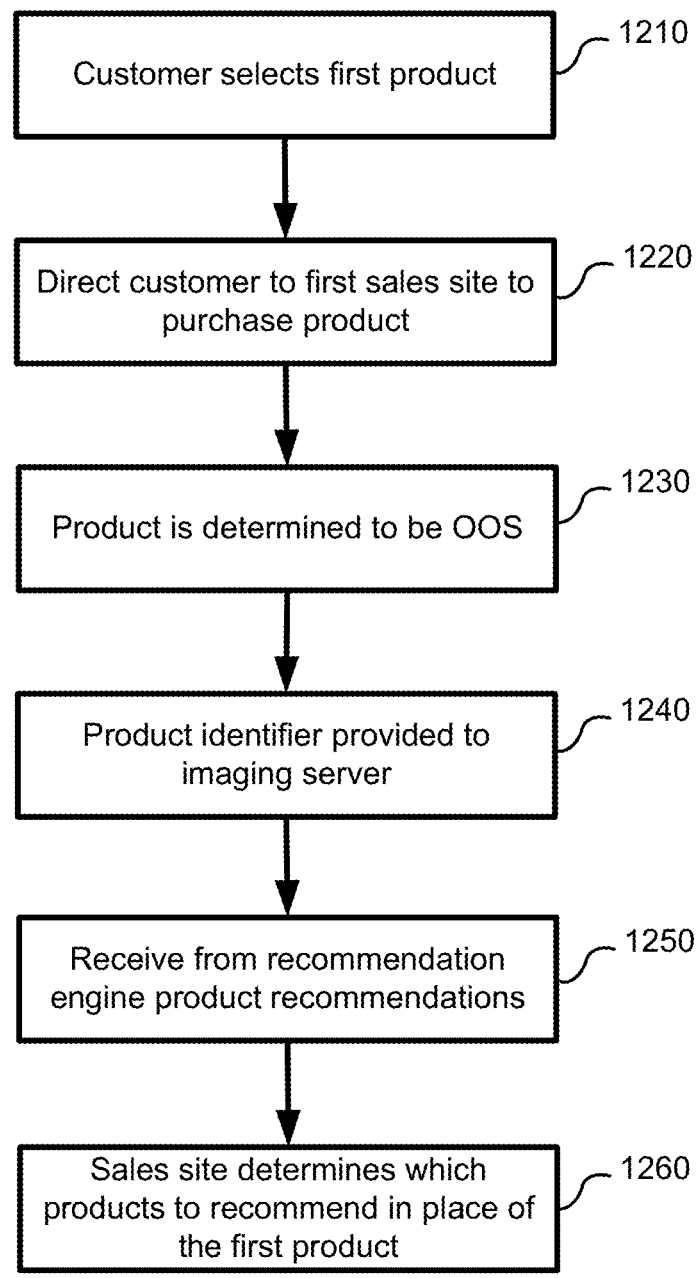
FIG. 12 is a simplified flow diagram of a method of addressing out of stock products by an online retailer.

FIG. 12 shows a non-limiting example of how a direct online retailer may implement the subject matter disclosed. A first product is selected for purchase by a customer from an online retailer (1210). The customer is redirected to a product sales web site or PDP (1220) where, unfortunately, the product is out of stock (1230) as provided by a stock count or stock indicator. The product sales website provides the product identifier for the product to the imaging server (1240) and the recommendation engine returns a listing of similar looking products with associated metadata such as Stock Keeping Unit (SKU) identifier, quantity of the product, origin of the product, price of the product, economic classification of the product, use of the product, construction material of the product, user ratings for the product, etc. (1250). Based on the retailer goals, the retailer displays a selection of the returned results to the customer (1260). For example, the retailer only may show the shoes that are available in their online store. Alternatively, the retailer may show only more expensive products than those sought by the customer. Yet alternatively, the retailer may show a grouping of available products having similar price and materials as well as a few options that are significantly less costly and significantly more costly, giving the customer additional choice.

Figure 13:
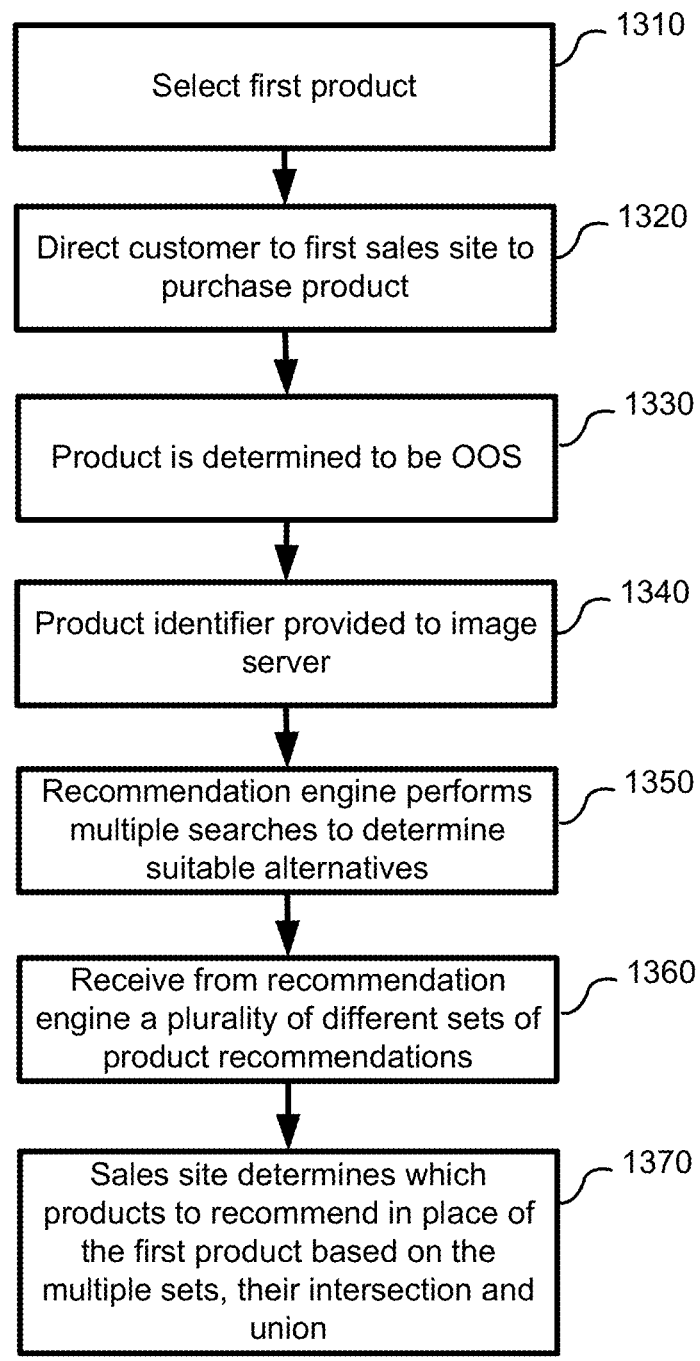
FIG. 13 is a simplified flow diagram of another embodiment wherein multiple image indices are formed using different correlation engines and/or different correlation criteria.

Referring to FIG. 13, shown is another embodiment wherein multiple image indices are formed using different correlation engines and/or different correlation criteria. A first product is selected by a customer from a sales site for purchase (1310). The customer is redirected to a product sales web site or PDP (1320) where the product is out of stock (1330). The product sales website provides the product identifier for the product to the image server (1340) and the resulting processes returns different image search results. Each search process is engaged and the different results are then mixed according to aggregation criteria to produce a final list of results (1350). The recommendation engine returns a plurality of different sets of product recommendations (1360), and the sales site determines which products to recommend in place of the first product based on the multiple sets, their intersection and union (1370). In some embodiments, only overlapping results are displayed and in others all results from some vendors are always displayed. In some embodiments, further processing allows for better resolution of result discrepancies.

Numerous other embodiments may be envisaged without departing from the scope of the disclosure. Application code may be embodied in any form of computer program product. A computer program product comprises a medium configured to store or transport computer readable code, or in which computer readable code may be embedded. Some examples of computer program products are non-volatile memories, CD-ROM, DVD-ROM, ROM cards, magnetic tapes, computer hard drives, solid state disks, servers on a network, and carrier waves.

The computer systems described above are for purposes of example only. An embodiment may be implemented in any type of computer system or programming or processing environment. It will be apparent to persons skilled in the art that a number of variations and modifications can be made without departing from the scope of the disclosure as defined in the claims.

The method steps may be embodied in sets of executable machine code stored in a variety of formats such as object code or source code. Such code is described generically herein as programming code, or a computer program for simplification. Clearly, the executable machine code or portions of the code may be integrated with the code of other programs, implemented as subroutines, plug-ins, add-ons, software agents, by external program calls, in firmware or by other techniques as known in the art.

The embodiments described above are intended to be illustrative only. The scope of the disclosure is therefore intended to be limited solely by the scope of the appended claims.

What is claimed is:

1. A system for classifying, searching and correlating images, comprising:
   a server containing at least one processor configured to receive product requests containing a product image;
   a first database for storing product images, and operably coupled to the server;
   a second database for storing product metadata, and operably coupled to the server;
   a third database for storing product identifiers based on image classification, and operably coupled to the server;
   a recommendation engine operably coupled to the server, wherein the recommendation engine is configured to determine a product availability and to return results comprising products that are similar to the received product request; and
   an imaging server operably coupled to the server, the imaging server configured to classify product images stored in the first database based upon feature descriptors of the images by:
      detecting one or more foreground objects within a received product image in a product request and for each foreground object from a background portion of the image generating a plurality of classifiers for the product image from the detected foreground to determine associated image object categories and attributes, wherein each attribute is associated with a subset of the plurality of classifiers;
      retrieving product metadata from the second database to associate with the product images from the determined image object categories, attributes and a product definition;
      correlating a plurality of product identifiers having one or more identical attributes and associated subset of image classifiers and at least a portion of the product metadata;
      generating a product identifier and product metadata to associate with the received product image from the image object category for storage in the third database; and
   wherein the recommendation engine matches products that have been correlated between the plurality of product identifiers and the received product request;
   wherein generating one or more classifiers for the product image comprises:
      computing, with a simple cells layer, convolution operations using filters selected from a group consisting of: 2D Gabor, or Gabor-like filters, over a range of parameters;
      performing, with a complex cells layer, a pooling operation over a retinotopically local cluster of simple cells within a complex receptive field;
      sending an output of the pooling operation to one of a group consisting of: the simple cells layer, complex cells layer, or a feature descriptor layer;
      terminating computations in the simple cells layer and complex cells layer as per a Cellular Neural Network definition, wherein the output is a set of values representing a set of feature descriptors;
      assessing, with a complex localization cells layer, regions in which an object of the product image is located; and
      classifying the image using the complex localization cells layer, regions and feature descriptors.

2. The system of claim 1 wherein the imaging server is further configured to receive a product identifier from the recommendation engine and determine similar product identifiers in the third database.

3. The system of claim 2 wherein the product images in the first database are populated by an affiliate site upon receiving the product images from an online retailer.

4. The system of claim 3 wherein the product metadata in the second database are populated by an affiliate site upon receiving product information from an online retailer.

5. The system of claim 1 wherein the recommendation engine is configured to determine an inventory indicator of a product associated with an HTML link embedded with an object in an image, wherein the HTML link is replaced to match an object that is in stock when a current HTML link is associated with an object that is out of stock.

6. The system of claim 1 wherein the product images in the first database are populated by an affiliate site upon receiving the product images from a plurality of on-line retailers, wherein the affiliate site can correlate product similarities between retailers providing similar products.

7. The system of claim 6 wherein the affiliate site is associated with a social media site.

8. The system of claim 6 wherein a product database stores product definitions in a hierarchy based on classification defining branch and leaf classifiers associated with image feature descriptors.

9. The system of claim 8 wherein the product metadata comprises one or more of: a Stock Keeping Unit (SKU) identifier, a quantity of the product, an origin of the product, price of the product, an economic classification of the product, a use of the product, a construction material of the product, and a user ratings for the product.

10. The system of claim 9 wherein a plurality of view images for a product are provided, each view image of the product having an associated image object category and attribute wherein image object category and attributes are combined for the SKU.

11. The system of claim 10 wherein determining products for an out of stock indicator may be determined on a subset of plurality of image views.

12. The system of claim 1 wherein the classifiers are associated with branch and leaf classifiers associated with one or more keywords of a category.

13. The system of claim 1 wherein the image is discarded when a foreground image is not detected.

* * * * *